Sept. 8, 1970  G. W. BICKEL ET AL  3,528,030
LASER CAVITY COMPRISING SEVERABLE ELEMENTS RESPECTIVELY
CARRYING THE LASER ROD AND PUMPING SOURCE
Filed Aug. 16, 1967

INVENTORS
GARY W. BICKEL
MARVIN L. LIPSHUTZ
JOHN J. FERRARA
BY
*Gary Bickel*
ATTORNEY United States Patent Office 3,528,030
Patented Sept. 8, 1970

3,528,030
LASER CAVITY COMPRISING SEVERABLE ELEMENTS RESPECTIVELY CARRYING THE LASER ROD AND PUMPING SOURCE
Gary W. Bickel, Boston, John J. Ferrara, Acton, and Marvin L. Lipshutz, Brookline, Mass., assignors to Honeywell Inc., a corporation of Delaware
Filed Aug. 16, 1967, Ser. No. 661,058
Int. Cl. H01s 3/05
U.S. Cl. 331—94.5                          1 Claim

ABSTRACT OF THE DISCLOSURE

An improved laser assembly in which both the lasing member and the pumping lamp are readily replaceable, and in which the lamp can be replaced without disturbing the alignment of the lasing member with respect to its external mirrors, including provision for wide manufacturing tolerances in pumping lamps.

BACKGROUND OF THE INVENTION

This invention relates to the field of lasers. It is known to use an elliptical reflector surrounding an excitable member and an exciting or pumping lamp, with the member and lamp located at the conjugate foci of the reflector. Heretofore, however, it has always been necessary to disassemble the entire unit whenever a lamp had to be changed, with the concommitent necessity of a long and tedious realignment of the assembly with the external mirrors.

SUMMARY OF THE INVENTION

The present invention has for its purpose and objective to provide a novel arrangement for mounting an excitable member and an exciting lamp in an elliptical reflector, at the conjugate foci thereof, respectively, so that each is readily replaceable, and so that the latter can be replaced without disturbing the alignment of the former with respect to external elements such as mirrors.

DESCRIPTION OF THE PREFERRED EMBODIMENT

Figure 1:
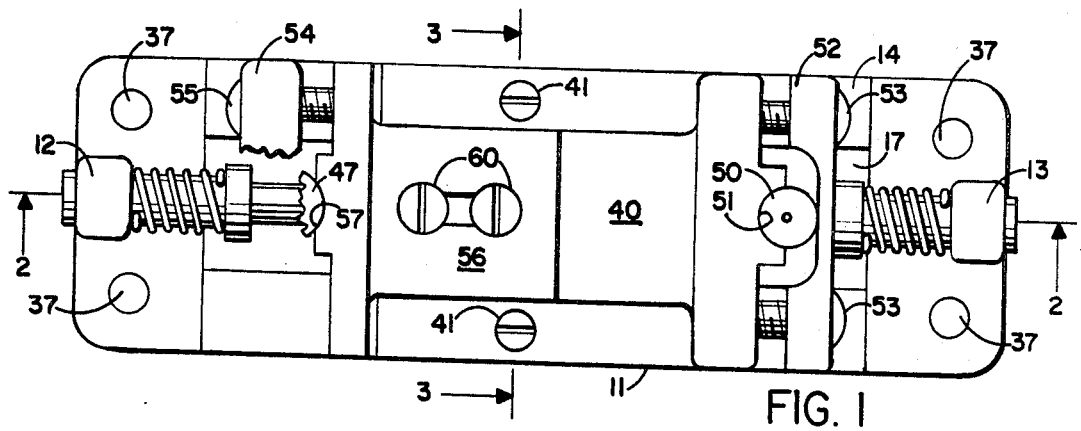
FIG. 1 is a block view of an arrangement according to the invention.
Figure 2:
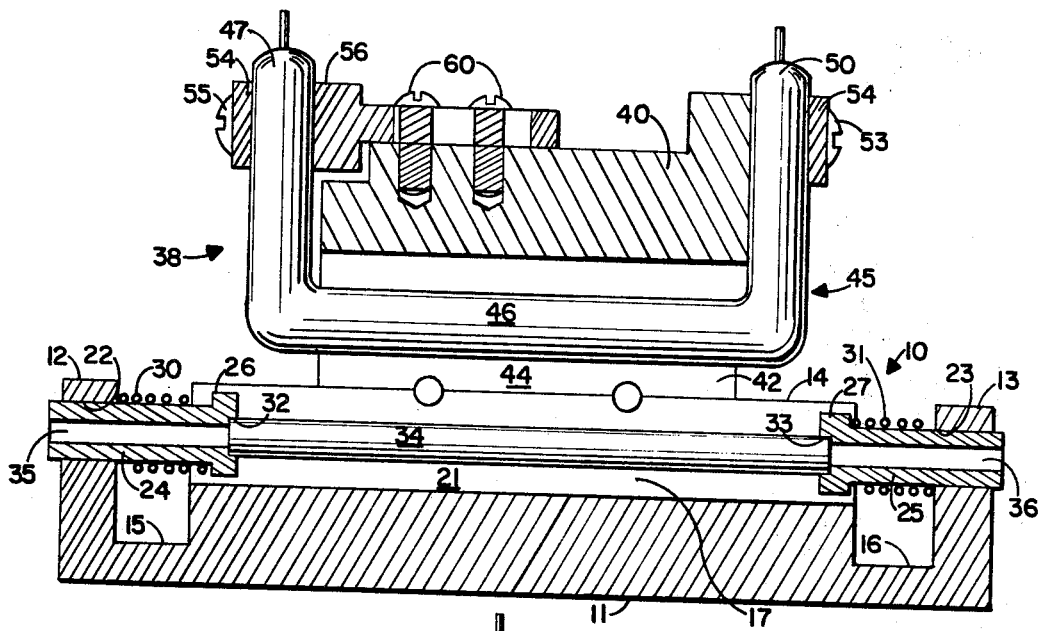
FIG. 2 is a section taken along line 2—2 of FIG. 1.
Figure 3:
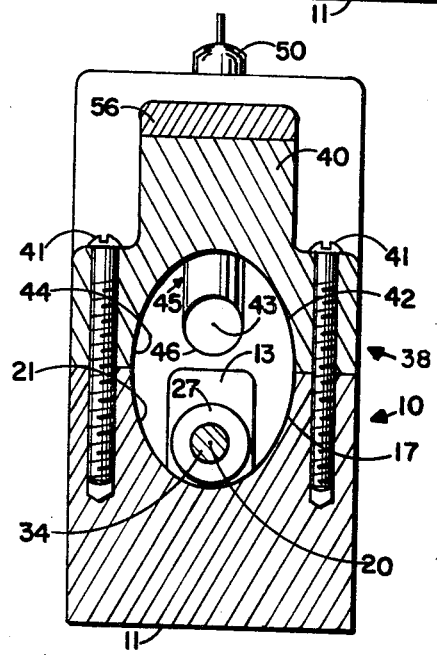
FIG. 3 is a section taken along the line 3—3 of FIG. 1.

The drawings show our improved arrangement to comprise a first assembly 10 including a support member 11 having a pair of end portions 12 and 13 spaced from a center portion 14 by a pair of slots 15 and 16. A cylindrical groove 17 extends along portion 14, and its cross section is half of an ellipse, one focus of which is shown at 20 in FIG. 3; the inner surface of groove 17 is polished to act as a reflector 21.

End portions 12 and 13 are coaxially bored at 22 and 23 in alignment with focus 20 of reflector 21 to slidably receive a pair of sleeves 24 and 25 having enlarged ends 26 and 27 and resiliently urged inwardly by compression springs 30 and 31, all respectively. The enlarged ends of the sleeves are recessed at 32 and 33 respectively to receive the ends of a laser rod 34 which comprises the excitable member of a laser, and are bored at 35 and 36 respectively to a diameter only slightly less than that of rod 34, to transmit the coherent laser light with minimum occulation to external optical components such as mirrors, not shown. The alignment of rod 34 with respect to these components may be maintained, after it has been accomplished, by suitable fastening means passing through holes 37 in member 11.

The drawings show a second assembly 38 including a support member 40 arranged to be separable from member 11, to which it may be secured by fastening means such as screws 41. A cylindrical groove 42 extends along member 40, and its cross section is also half of an ellipse, one focus of which is shown at 43 in FIG. 3; the inner surface of groove 42 is polished to act as a reflector 44. A flash lamp 45 having an elongated central portion 46 and end portions 47 and 50 extending generally at right angles thereto is supported with portion 46 extending along the focus of reflector 44.

Support member 40 has a recess 51 to receive end 50 of lamp 45, which is secured thereto by a clamp 52 including screws 53 or other suitable fasteners. The position of lamp 45 is adjusted until the central portion 46 thereof coincides with the focus of reflector 44 before clamp 52 is tightened. A similar clamp 54 including fastening means 55 is supplied to secure the other end 47 of lamp 45: because of manufacturing tolerances from lamp to lamp, clamp 54 cooperates with a member 56 having a groove 57 to receive the end of the lamp, and member 56 is made adjustable longitudinally with respect to member 40, being secured in an adjustable position by suitable fastening means such as screws 60.

Maintenance of an arrangement such as that described most frequently involves replacing a lamp. When this becomes necessary screws 41 are removed and assembly 38 may be lifted off unitarily, without disturbing the alignment of rod 34 either in the optical system or in relation to reflector 21. Clamps 52 and 54 are loosened, lamp 46 is disconnected and removed and a new lamp inserted, positioned so that portion 46 is on the focus of reflector 44, and secured in place, after which assembly 38 is again secured to assembly 10. The desirable maximum energy transfer from lamp 45 to rod 34 is automatically assured by the configuration of the reflectors and the location of the rod and lamp at conjugate foci of the resulting closed elliptical reflector.

If it becomes necessary to replace a laser rod, sleeves 24 and 25 are moved against the springs so that the removal of a rod and substitution of another is very simple, and involves no substantial realignment of member 11 with respect to external components.

In the foregoing disclosure of the invention we have set forth details and advantages of the structure and its function, and the operation and novel features thereof are pointed out in the appended claims. The disclosure and drawings are illustrative of our invention, which we now claim as follows.

We claim as our invention:
1. In a laser device having an elongated reflector with a pair of conjugate foci in combination:
    a first assembly including a first portion of said reflectory in which is located one of said foci;
    a second assembly including a second portion of said reflector in which is located the other of said foci;
    means separably securing said assemblies together so that said reflectors form a closed hollow surface such that all rays of light radiating from one focus pass through the other focus;
    an elongated member excitable to emit coherent electromagnetic radiation along an axis;
    means resiliently mounting said member to comprise a portion of said first assembly, with said axis coinciding with one of said foci, including means for enabling egress of said coherent radiation from said first assembly;
    means for mounting said first assembly in an optical system with the axis of the excitable member critically oriented with respect to the system;
    a second elongated member energizable to supply excitation for the excitable member, said member hav- ing a central portion with an axis of symmetry and end portions having axes extending angularly with respect to said axis of symmetry;

and means removably mounting the second elongated member to comprise a portion of said second assembly, said second assembly comprising a support member having means securing the end portions of said exciting means to said support member so that the axis of symmetry of said central portion passes through the said other of said foci;

so that upon separation of said assemblies the excitable and exciting members are also separated from each other, whereby said exciting member may be serviced or replaced without disturbing the orientation of said excitable member relative to said system.

References Cited
UNITED STATES PATENTS

| | | | |
|---|---|---|---|
| 242,984 | 6/1881 | Reynier | 313—237 |
| 2,177,710 | 10/1939 | Gordon | 313—109.5 |
| 3,210,688 | 10/1965 | Simpson | 331—94.5 |
| 3,310,753 | 3/1967 | Burkhalter | 331—94.5 |

RONALD L. WIBERT, Primary Examiner

T. MAJOR, Assistant Examiner